(12) United States Patent
Tani

(10) Patent No.: US 7,051,840 B2
(45) Date of Patent: May 30, 2006

(54) POWER UNIT

(75) Inventor: Nobuyuki Tani, Osaka (JP)

(73) Assignee: Sauer-Danfoss-Daikin Ltd., Settsu (JP)

( * ) Notice: Subject to any disclaimer, the term of this patent is extended or adjusted under 35 U.S.C. 154(b) by 59 days.

(21) Appl. No.: 10/276,251

(22) PCT Filed: Feb. 19, 2002

(86) PCT No.: PCT/JP02/01436

§ 371 (c)(1),
(2), (4) Date: Nov. 15, 2002

(87) PCT Pub. No.: WO02/066869

PCT Pub. Date: Aug. 29, 2002

(65) Prior Publication Data

US 2003/0089107 A1    May 15, 2003

(30) Foreign Application Priority Data

Feb. 19, 2001    (JP)    ............................ 2001-041913

(51) Int. Cl.
*F01M 1/00*    (2006.01)

(52) U.S. Cl. .................. 184/6.12; 184/6.22; 184/104.3

(58) Field of Classification Search ................ 184/6.1, 184/6.12, 6.22, 104.1, 104.2, 104.3; 475/72, 475/78, 159

See application file for complete search history.

(56) References Cited

U.S. PATENT DOCUMENTS

| | | | |
|---|---|---|---|
| 3,832,980 A | 9/1974 | Fujikawa et al. | |
| 4,341,131 A * | 7/1982 | Pollman | ...................... 475/81 |
| 5,085,053 A | 2/1992 | Hayashi et al. | |
| 5,231,894 A | 8/1993 | Okita et al. | |
| 5,584,214 A * | 12/1996 | Hayashi et al. | ............ 74/732.1 |
| 6,021,868 A | 2/2000 | Bogema | |
| 6,314,934 B1 * | 11/2001 | Ito et al. | .................. 123/196 R |
| 6,357,413 B1 * | 3/2002 | Ito et al. | .................. 123/197.1 |
| 6,527,087 B1 * | 3/2003 | Ito et al. | ...................... 184/6.5 |
| 6,837,209 B1 * | 1/2005 | Hori et al. | .............. 123/196 R |
| 2003/0136447 A1* | 7/2003 | Horie et al. | ........... 137/565.13 |

FOREIGN PATENT DOCUMENTS

| | | |
|---|---|---|
| JP | 56-53628 A | 5/1981 |
| JP | 08-042351 | 2/1996 |
| JP | 10-132056 A | 5/1998 |

OTHER PUBLICATIONS

Microfilm of the Specification and Drawings Annexed to the Request of Japanese Utility Model Application No. 81625/1989 (Laid-Open No. 21509/1991) (Mitsubishi Motors Corp.), Mar. 4, 1991 Full Text; Fig. 1 (Family: None).

* cited by examiner

*Primary Examiner*—David Fenstermacher
(74) *Attorney, Agent, or Firm*—Donald R. Studebaker; Nixon Peabody LLP

(57) ABSTRACT

In a power unit comprising an engine (13) and an HST (24) which are formed into an integral body, a lubricating oil for use in the engine and an operating oil of the HST (24) are commonized. After being cooled, the common oil is fed from the side of the engine (13) to the HST (24). Such arrangement suppresses the drop in viscosity of the common oil and prevents the drop in efficiency and the occurrence of seizing on the side of the HST (24).

12 Claims, 7 Drawing Sheets

POWER UNIT

TECHNICAL FIELD

This invention relates to a power unit of the configuration in which a transmission mechanism including a hydro static transmission is mounted integrally on the engine. More specifically, the invention relates to a cooling structure for cooling a common oil which is shared as an engine lubricating oil and as an operating oil.

BACKGROUND ART

In the past, all-terrain vehicles (hereinafter ATVs) such as four wheeled buggy vehicles, buses, trucks, a variety of construction machines, and various industrial machines have employed an infinitely variable transmission which is called a hydro mechanical transmission (hereinafter HMT). As described in U.S. Pat. No. 4,341,131 and Japanese Patent Kokai No. S54-35560, the HMT is implemented by combining a hydro static transmission (hereinafter HST) that makes utilization of operating-oil hydrostatic energy and a mechanical transmission (hereinafter MT) through a differential gear mechanism such as a planetary gear mechanism. The HMT is so configured as to perform non-stage, continuous power transmission by synthesizing input on the HST side and input on the MT side in the differential gear mechanism.

A technique has been known in the art in which an HMT is mounted integrally on the engine. One such configured power unit is described for example in Japanese Patent Kokai No. H07-113454 (U.S. Pat. No. 3,016,057). As a way of realizing integration of an engine and an HMT, there are some techniques. In one technique, an HMT casing is mounted fixedly to an engine crank case. In another technique, an engine and an HMT are arranged within a common casing.

For the case of integrating together an engine and an HMT in the way as described above, it is possible to share a common oil as an engine lubricating oil and as an HST operating oil. Further, such a common oil is possibly used even in such cases that only the HST is used as a transmission device and is integrated with the engine.

In these cases, however, it is difficult to have control of the temperature of the common oil. In other words, generally the oil temperature is higher on the engine side than on the HST side. Therefore, at the time when the common oil, which has risen in temperature, is circulated to the HST, its viscosity is too low to serve as an operating oil for the HST. This causes considerable leakage of the common oil, thereby producing the possibility that there is a drop in the mechanical efficiency of power transmission. Further, there is the possibility that there occurs a seizing due to overheat.

Bearing in mind the aforesaid problems, the invention was made. Accordingly, an object of the invention is to prevent a drop in the efficiency and the occurrence of seizing on the HST side in such cases that the engine and the HST share a common oil.

DISCLOSURE OF THE INVENTION

In the invention, it is arranged such that, after being cooled, a common oil is supplied to the HST (24) from the side of the engine (13).

More specifically, the invention provides, as a first problem-solving means, a power unit which comprises an engine (13) and a transmission mechanism (T) including a hydro static transmission (24) which are integrally formed and in which a common oil is shared as a lubricating oil and as an operating oil. The present power unit is characterized in that it further comprises an oil feed means (70, 15) for circulating the common oil between the engine (13) and the hydro static transmission (24) and a cooling means (40d, 77) for cooling the common oil in an oil feed route (R) from the engine (13) to the hydro static transmission (24).

Further, the invention provides a second problem-solving means according to the first problem-solving means which is characterized in that the transmission mechanism (T) is formed by combining the hydro static transmission (24) and a mechanical transmission (23). In other words, the transmission mechanism (T) is a hydro mechanical transmission.

In the first and second problem-solving means, the common oil is circulated between the engine (13) and the hydro static transmission (24) by the oil feed means (70, 15) so that it serves as a lubricant in the engine (13) and as an operating oil in the hydro static transmission (24). Further, the common oil, which has risen in temperature on the side of the engine (13), is cooled by the cooling means (40d, 77) in the oil feed route (R) on the way to the hydro static transmission (24). In other words, after being increased in viscosity by cooldown to a lower temperature than the oil temperature on the side of the engine (13), the common oil thus cooled is supplied to the hydro static transmission (24).

Further, the invention provides a third problem-solving means according to either the first problem-solving means or the second problem-solving means which is characterized in that the cooling means comprises a heat release part (40d) provided on an outer surface of a casing (40, 42) of the power unit (U) and the oil feed route (R) is so arranged as to lie along the heat release part (40d). The heat release fin (40d) may be implemented by a heat release fin.

As a result of such arrangement, the common oil gives off the heat in the heat release part (40d) mounted on the outer surface of the casing (40, 42) when flowing through the oil feed route (R) from the engine (13) in the direction of the hydro static transmission (24). As a result, the common oil cools off. After being increased in viscosity by cooldown to a lower temperature, the common oil thus cooled is supplied to the hydro static transmission (24).

Further, the invention provides a fourth problem-solving means according to either the first problem-solving means or the second problem-solving means which is characterized in that the cooling means comprises an oil cooler (77) provided in the oil feed route (R).

As a result of such arrangement, the common oil is cooled in the oil cooler (77) provided in the oil feed route (R) when flowing through the oil feed route (R) from the engine (13) toward the hydro static transmission (24). As described above, after being increased in viscosity by cooldown to a lower temperature, the common oil thus cooled is supplied to the hydro static transmission (24).

Further, the invention provides a fifth problem-solving means according to either the first problem-solving means or the second problem-solving means which is characterized in that the oil feed means comprises a charge pump (70) of the hydro static transmission (24).

As a result of such arrangement, the common oil flows from the engine (13) to the hydro static transmission (24) through the use of charge pressure of the charge pump (70) of the hydro static transmission (24), whereby the common oil can circulate between the engine (13) and the hydro static transmission (24).

Further, the invention provides a sixth problem-solving means according to either the first problem-solving means or the second problem-solving means which is characterized in that the oil feed means comprises a lubricating pump (15) of the engine (13).

As a result of such arrangement, the common oil is delivered from the engine (13) to the hydro static transmission (24) through the use of the lubricating pump (15), whereby the common oil can circulate between the engine (13) and the hydro static transmission (24).

In accordance with the first problem-solving means, after being increased in viscosity by cooldown to a temperature lower than the oil temperature on the side of the engine (13) the common oil thus cooled is supplied to the hydro static transmission (24). This makes it possible to suppress leakage and to prevent a drop in the mechanical efficiency of power transmission. Further, it is possible to prevent the occurrence of seizing in the hydro static transmission (24). Besides, the use of the common oil eliminates the need for separate provision of oil reservoirs for different oils, thereby allowing the unit to be designed compactly.

Further, in accordance with the second problem-solving means, in the power unit in which the engine (13) and the HMT (T) are formed into an integral body it is possible to reliably prevent a drop in the mechanical efficiency of power transmission by suppressing the degree of leakage of the common oil taking place on the side of the HST (24). Besides, it is possible to prevent the occurrence of seizing and to provide compact designing.

Furthermore, in accordance with the third problem-solving means, by virtue of the arrangement that the heat release part (40d) implemented by for example a heat release fin is provided in the casing (40, 42) of the power unit (U) and the oil feed route (R) is passed along the heat release part (40d), it becomes possible to realize a power unit (U) capable of providing the same effects as the first and second problem-solving means with a simplified structure.

Further, in accordance with the fourth problem-solving means, by virtue of the arrangement that the oil cooler (77) is provided in the oil feed route (R), it becomes possible to realize a power unit (U) capable of providing the same effects as the first and second problem-solving means with a simplified structure. Further, the oil cooler (77) may be shared between the engine's (13) side and the transmission mechanism's (T) side, thereby making it possible to provide compact designing of the unit.

Furthermore, in accordance with the fifth (sixth) problem-solving means, by making use of the charge pump of the hydro static transmission (24) (the lubricating pump 15 of the engine (13) in the sixth problem-solving means), it becomes possible to realize a power unit (U) capable of providing the same effects as each of the previous problem-solving means, without making the structure complicated.

BEST MODE FOR CARRYING OUT THE INVENTION

Hereinafter, a first embodiment of the invention will be described in detail with reference to the Figures. The first embodiment is an example in which a power unit comprising an engine and an HMT (i.e., a transmission mechanism) which are formed into an integral body, is mounted on a four-wheel-drive ATV. The power unit is configured in order that a common oil may be shared as an engine lubricating oil and as an HMT operating oil.

Figure 1:
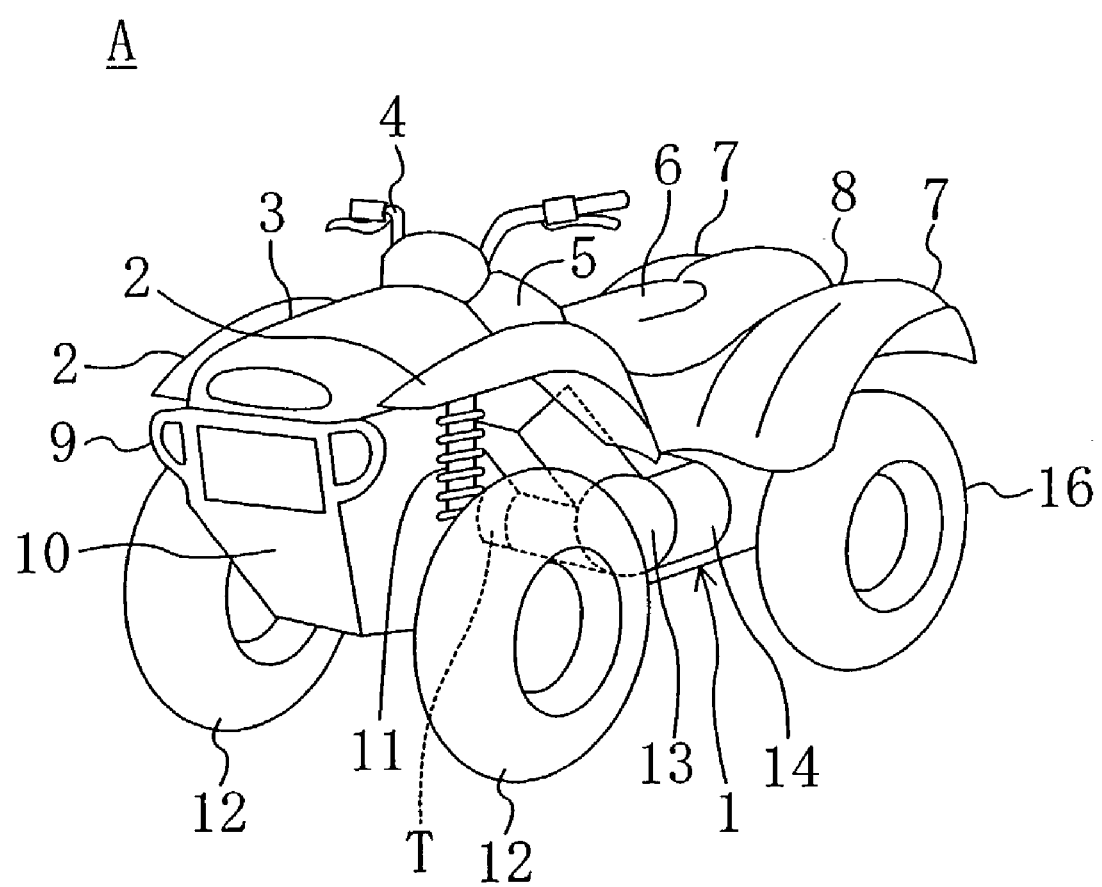
FIG. 1 is an outline view of an ATV that employs a power unit in accordance with a first embodiment of the invention.

Referring to FIG. 1, there is illustrated an exterior appearance of the ATV (A). The reference numeral (1) denotes a vehicle body comprised of a pipe frame, details of which are not described here. Mounted on an upper side of the vehicle body (1) in the order given (from front to rear) are a front cowl (3) having, at either side thereof, fenders (2) and (2) respectively, a handle (4), a fuel tank (5), a driver's seat (6), and a rear cowl (8) having, at either side thereof, fenders (7) and (7) respectively.

Provided at the vehicle body forefront under the front cowl (3) is an under cowl (10) formed integrally with a bumper (9). And, a right and left front wheels (12) and (12) are disposed, through strut suspensions (11), at the rear of the under cowl (10). Further, a power train, which is made up of an engine (13), an HMT (T), and a secondary transmission (14), is disposed extendedly from under the fuel tank (5) to under the seat (6), and the HMT (T) is located, substantially directly under the seat (6). And, rear wheels (16) and (16) are disposed, through respective trailing arm suspensions (not shown), at the rear of the power train on either side of the vehicle body (1).

Figure 2:
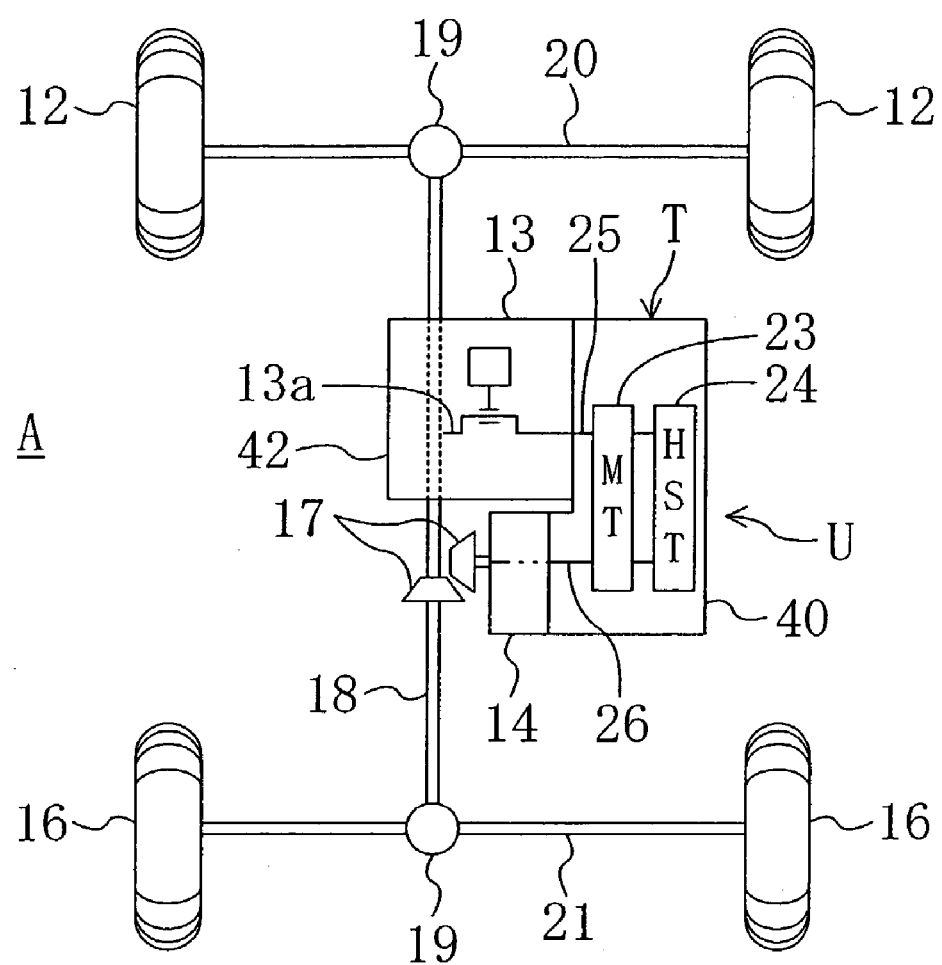
FIG. 2 is a power transmission path diagram of the ATV of FIG. 1.

FIG. 2 is a view showing a frame format of an arrangement of a power transmission path extending from the engine (13) to the wheels (12) and (16) in the ATV (A), when viewed from above the vehicle body, and the engine (13) is sideways-mounted on the vehicle body, with a crank shaft (13a) oriented in the direction of the width of the ATV (A). The HMT (T) is disposed in close proximity to a crank case (42) so that it is located on the right side of the engine (13) (i.e., on one side with respect to the vehicle width direction). And, a transmission casing of the HMT (T) is attached integrally to the crank case (42). The engine (13) and the HMT (T) together constitute a power unit (U).

The rear end of the HMT (T) extends beyond the crank case rear end of the engine (13) to the rear side of the vehicle body. Disposed on the left side of the HMT (T) (i.e., on the vehicle width direction other side), in other words, disposed at the vehicle body rear of the engine (13) are a secondary transmission (14) and a pair of bevel gears (17) and (17) for changing the direction of output rotation from the secondary transmission (14). The bevel gear (17) on the driven side is mounted on a drive shaft (18) extending in the vehicle body longitudinal direction under the vehicle body (1), and the front and rear ends of the drive shaft (18) are connected, through differential gears (19) and (19), to a front axle shaft (20) and to a rear axle shaft (21), respectively.

In the configuration described above, the HMT (T) is disposed nearer to the right side than the center of the engine (13) with respect to the vehicle width direction. The HMT (T) is located nearer to the outside with respect to the vehicle width direction than any other components in the power train.

The HMT (T) once divides input rotation from the crank shaft (13a) of the engine (13), transmits the divided input rotation to the mechanical transmission (MT) (23) and the hydro-static transmission (HST) (24), synthesizes the transmitted input rotation by a planetary gear mechanism of the MT (23), and outputs the synthesized rotation.

Figure 3:
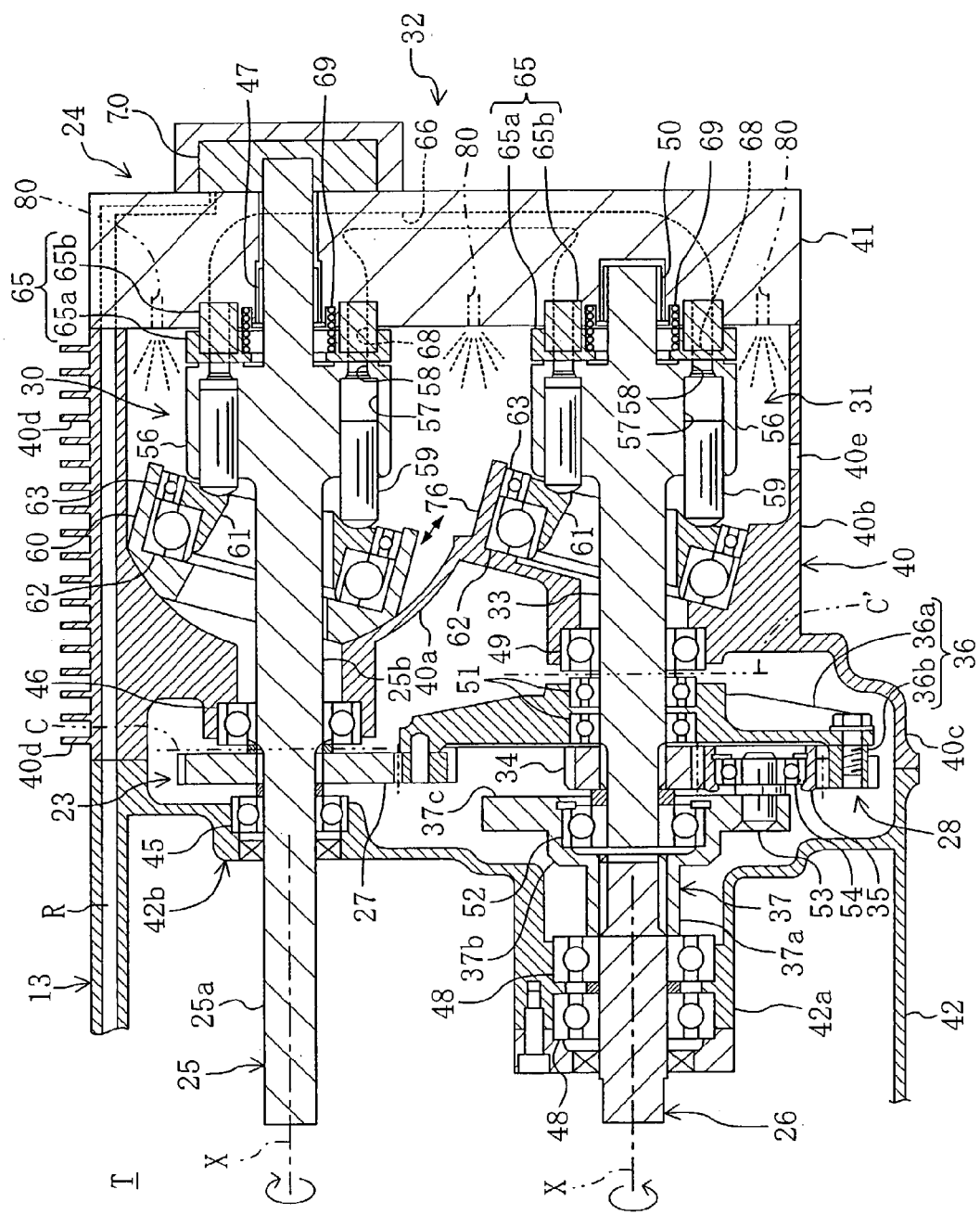
FIG. 3 is a cross-sectional structural view of the power unit of FIG. 1.
Figure 4:
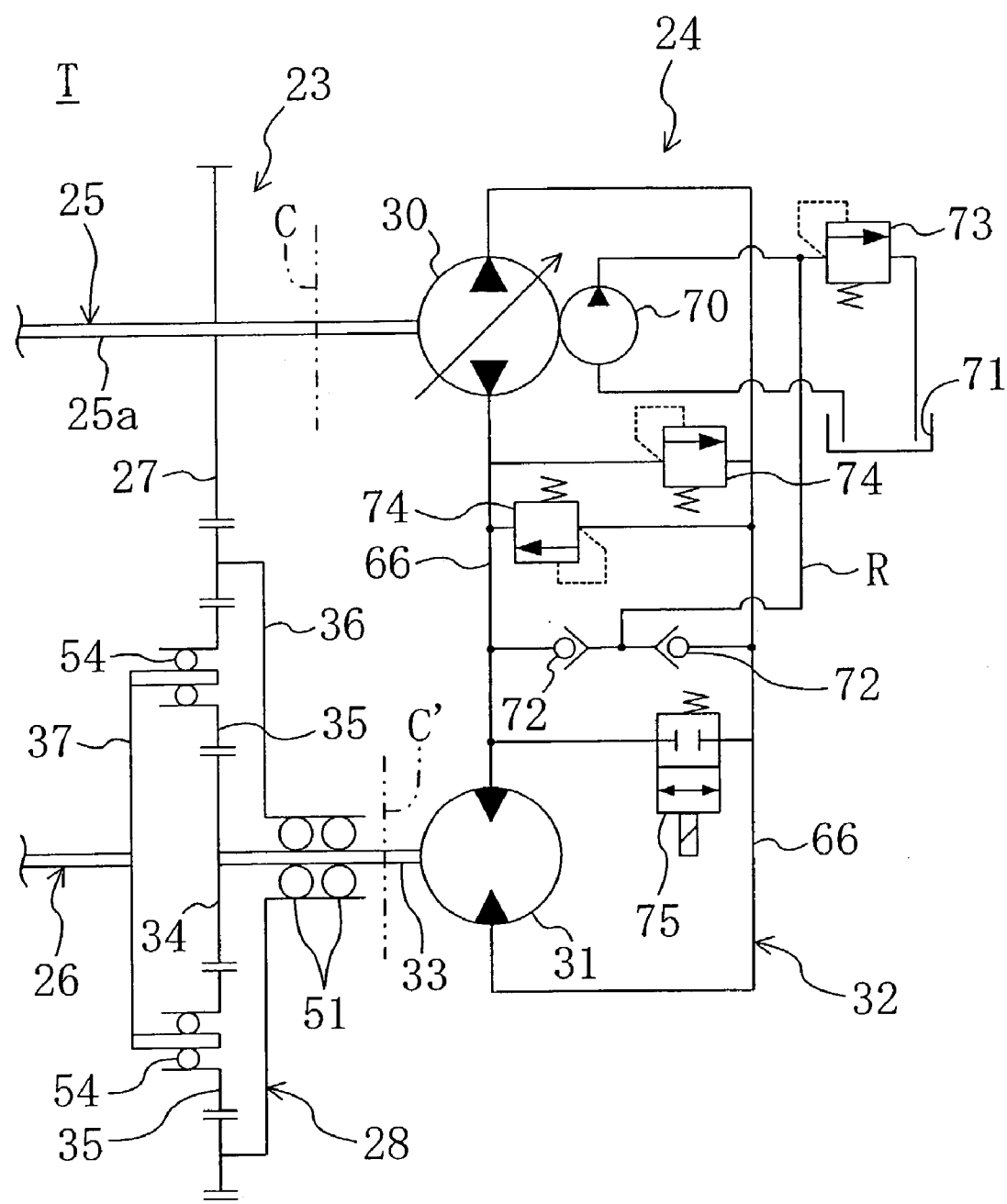
FIG. 4 is a schematic configurational diagram of the power unit of FIG. 1.

As shown in FIG. 3 and in FIG. 4, respectively, the MT (23) comprises an input shaft (25) directly connected to an end of the crank shaft (13a) which projects toward the vehicle-body right side of the engine (13), an input gear (27) which is so mounted on an intermediate part of the input shaft (25) by splines as to rotate together with the input shaft (25), and a planetary gear mechanism (28) which is disposed in coaxial alignment with an output shaft (26) and which receives input rotation from the input gear (27). Further, the HST (24) is constructed by connecting an in-line axial piston pump (30) (hereinafter referred to just as a piston pump) and an in-line axial piston motor (31) (hereinafter referred to just as a motor) by a hydraulic closed circuit (32).

The planetary gear mechanism (28) of the MT (23) comprises a sun gear (34) which is mounted on a shaft (33) of the motor (31) so as to rotate integrally therewith, a plurality of planetary gears (35) (only one of which is shown in the figure) which engage with the sun gear (34) and which moves around the sun gear (34) while turning around on its axis, a ring gear (36) whose inner-peripheral internal teeth engage with the plural planetary gears (35) and which is provided with outer-peripheral external teeth which engage with the input gear (27), and a planetary carrier (37) which is mounted on an end of the output shaft (26) on the one side so as to rotate integrally therewith and which rotatably supports each of the plural planetary gears (35).

And, a part of the rotational force fed to the input shaft (25) is transmitted from the input gear (27) to the ring gear (36) of the planetary gear mechanism (28), whereas the rest of the rotational force is converted into hydraulic force by the piston pump (30) for forwarding to the motor (31) via the hydraulic closed circuit (32) and is converted again into rotational force by the motor (31) for forwarding to the sun gear (34) mounted on the motor shaft (33). Rotational forces transmitted from the ring gear (36) and the sun gear (34) which are in rotation to the plural planetary gears (35) in engagement with the ring gear (36) and the sun gear (34) are synthesized and output to the output shaft (26) from the planetary carrier (37).

The structure of the HMT (T) according to the first embodiment will be described in greater detail.

First, as shown in FIG. 3, the MT (23) and the HST (24) are mounted integrally to a transmission casing (40), and the transmission casing (40) is attached integrally to a crank case (42) of the engine (13). The transmission casing (40) is divided by a dividing wall portion (40a) into one side (a vehicle-body right side) and anther side (a vehicle-body left side) with respect to the axial direction of the input shaft (25). An opening end of an area of the transmission casing (40) located nearer to the vehicle-body right side than the dividing wall portion (40a) is closed by an end cap (41), thereby defining an HST housing portion (40b) for accommodating therein the piston pump (30) and motor (31) of the HST (24). Further, an area of the transmission casing (40) located nearer to the vehicle-body left side than the dividing wall portion (40a) is closed by the crank case (42), thereby defining an MT housing portion (40c) for accommodating therein the MT (23) in the inside of the closed space.

In the first embodiment, the input shaft (25) of the HMT (T) is formed integrally with a pump shaft of the piston pump (30). On the vehicle-body front side (the upper side in the figure) of the transmission casing (40), the integrally formed input shaft (25) is so disposed as to extend in the vehicle width direction, passing through the crank case (42), the dividing wall portion (40a) and the end cap (41). And, the input shaft (25) is rotatably supported by roller bearings (45), (46), and (47) mounted on the crank case (42), on the dividing wall portion (40a), and on the end cap (41), respectively.

The input shaft (25) is formed by integration of an input shaft portion (25a) as an original input shaft for accepting rotation from the crank shaft (13a) and a pump shaft portion (25b) having a pump shaft function which are bordered by a virtual line C of the figure. Further, an arrangement may be made in which the input shaft (25) and the pump shaft are formed as separate parts and they are coupled together by coupling or other technique.

On the other hand, the output shaft (26) of the HMT (T) is so disposed as to extend in parallel with the input shaft (25) in the vehicle width direction on the vehicle-body rear side of the transmission casing (40) (the underside in the figure). The output shaft (26) is rotatably supported by two roller bearings (48) and (48) disposed in a cylindrical boss portion (42a) which is so formed in a cover portion (42b) of the crank case (42) as to project to the left in the figure.

In the way as described above, the input shaft (25) and the output shaft (26) extend in parallel with the crank shaft (13a) of the engine (13) in vehicle width direction and are disposed in parallel with and apart from each other in vehicle longitudinal direction. Further, the output shaft (26) is located in coaxial alignment with the shaft (33) of the motor (31) and its vehicle-body left side (vehicle width direction other side) end is coupled to a main shaft of the secondary transmission (14) by coupling (not shown), whereas the vehicle-body right side (vehicle width direction one side) end is connected to the planetary carrier (37) of the planetary gear mechanism (28).

The motor shaft (33) of the HST (24) passes through the dividing wall portion (40a) of the transmission casing (40), extends in vehicle width direction, and is rotatably supported by roller bearings (49) and (50) disposed in the dividing wall portion (40a) and in the end cap (41), respectively. And, mounted on the motor shaft (33) which passes through the dividing wall portion (40a) and projects into the interior of the MT housing portion (40c) are the ring gear (36), the sun gear (34), and the planetary carrier (37) of the planetary gear mechanism (28), in the order of nearness in position to the dividing wall portion (40a). The ring gear (36) is made up of a disc-like plate portion (36a) which is rotatably mounted on the motor shaft (33) by bearings (51) and (51) and a ring-like gear portion (36b) which is attached to an outer peripheral portion of the plate portion (36a). Formed in an inner peripheral side of the gear portion (36b) are internal teeth which externally engage with the planetary gear (35). Further, formed in an outer peripheral side of the gear portion (36b) are external teeth which engage with the input gear (27).

Furthermore, the sun gear (34) is connected to the motor shaft (33) by splines so as to rotate integrally therewith and is so designed as to internally engage with the planetary gear (35) located between the sun gear (34) and the ring gear (36). Further, the planetary carrier (37) has a tubular portion (37a) which is externally inserted onto an end of the output shaft (26) and is fixed there by splines so as to rotate integrally with the output shaft (26). An extended-diameter portion (37b) of relatively large diameter and a disc-like flange portion (37c), which are formed at one side of the tubular portion (37a), are attached rotatably to the vehicle width direction other side end of the motor shaft (33) by a bearing (52) press-fit into the inside of the expanded-diameter portion (37b). A plurality of pins (53), (53), and so on (only one of which is shown in the figure) are disposed at respective positions of the flange portion (37c) of the planetary carrier (37) which are circumferentially equally spaced, and each planetary gear (35) is rotatably supported on a roller bearing (54) which is interfit to each pin (53).

To sum up, the planetary gear mechanism (28) of the MT (23) is positioned on the vehicle-body right side of the output shaft (26) and is connected to an end of the output shaft (26) on the vehicle-body right side as well as to the shaft (33) of the motor (31) which is located on the vehicle-body right side across the dividing wall portion (40a) of the transmission casing (40). Alternatively, an arrangement may be made in which the motor shaft (33) is bordered at an area indicated by a virtual line C' of the figure for division into a central shaft of the planetary gear mechanism (28) and an original motor shaft (33) and these two shafts are coupled together by coupling or other technique at the area.

Next, the structure of the piston pump (30) of the HST (24) will be described in greater detail.

The piston pump (30) is formed by integral mounting of a cylinder barrel (56) on the pump shaft portion (25b) of the input shaft (25). Although not shown in detail in the figure, a plurality of cylinder chambers (57), (57), and so on are defined in the interior of the cylinder barrel (56). More specifically, these cylinder chambers (57) are circumferentially defined at respective locations on the circumference centered at a shaft center (X), extending in the direction of the shaft center (X). A port (58) is defined at one side (the right side in the figure) in shaft center direction of the cylinder chamber (57) so as to open to one side end face in shaft center direction of the cylinder barrel (56). On the other hand, the other side of the cylinder chamber (57) opens to the swash plate side end surface, i.e., the other side end face in shaft center direction of the cylinder barrel (56). Each cylinder chamber (57) houses an associated piston (59) in such a way that the piston (59) can reciprocate therein.

Variable swash plates (60) for controlling the reciprocating stroke of the pistons (59), (59), and so on are each disposed face to face with an end surface of its associated cylinder barrel (56) on the swash plate side. As described above, in the swash plate (60), a thrust plate (61) for holding, in abutment manner, an end of the piston (59) projecting from the cylinder chamber (57) is supported by two roller bearings (62) and (63) and is allowed to rotate smoothly around the shaft center (X) together with the piston (59) and the cylinder barrel (56). Further, the variable swash plate (60) is constructed so that it can tilt, with respect to the neutral position at which the swash plate angle becomes zero, between a maximum inclination position at which the angle of inclination of the swash plate during normal rotation is maximum and a maximum inclination position at which the angle of inclination of the swash plate during reverse rotation is maximum (see FIG. 3). And, although not shown in the figure, the variable swash plate (60) is tilted by an actuator such as a hydraulic cylinder and a DC motor, whereby the angle of the swash plate can be increased or decreased.

When the input shaft (25) and the cylinder barrel (56) are rotationally driven by input from the engine (13), the pistons (59), (59), and so on each reciprocate for a stroke corresponding to the angle of inclination of its associated variable swash plate (60), while moving around the shaft center (X). Because of this, both the supplying of operating oil to each cylinder chamber (57) and the draining of operating oil from each cylinder chamber (57) are carried out. In other words, in the cylinder chamber (57) which is in the state of an operating oil delivery stroke the piston (59) is pushed into the cylinder chamber (57) along the inclination of the swash plate (60). The operating oil held in the inside of the cylinder chamber (57) is discharged out of the cylinder barrel (56) through the port (58). On the other hand, in the cylinder chamber (57) which is in the state of a suction stroke, upon receipt of the pressure (charge pressure) of operating oil flowing into the cylinder chamber (57) through the port (58), the piston (59) is gradually pushed out of the cylinder chamber (57) along the inclination of the swash plate (60).

The supplying of operating oil to each cylinder chamber (57) and the draining of operating oil from each cylinder chamber (57) are carried out via a valve plate (65) which makes sliding contact with an end face of the cylinder barrel (56) on the port side. In other words, the valve plate (65) serves to change the state of communication of the cylinder chambers (57), (57), and so on, with respect to a pair of oil passageways (66) and (66) defined in the end cap (41), i.e., a pair of oil passageways together constituting the hydraulic closed circuit (32) between the hydraulic piston pump (30) and the motor (31). Although not shown in detail in the figure, the valve plate (65) is shaped like a flattened cylinder in totality and is provided with two hole portions (68) and (68) corresponding to the passageways (66), respectively. The hole portions (68) and (68) each are elongated in the direction of the circumference of the cylinder barrel (56) and have a circular arc-like cross section. And, as described above, the operating oil discharged from the cylinder chamber (57) which is in the state of a delivery stroke circulates through one passageway (66) via one hole portion (68) of the valve plate (65), while on the other hand the operating oil flowing back from the other oil passageway (66) is supplied to the cylinder chamber (57) which is in the state of a suction stroke via the other hole portion (68).

Further, the valve plate (65) is of a floating type and is press-energized against a port side end face of the cylinder barrel (65) by a coil spring (69) (energizing means). The valve plate (65) comprises a large tubular member (65a) of relatively large diameter having a slide face which is brought into sliding contact with the port side end face of the cylinder barrel (56) and a small tubular member (65b) which is interfit into the inside of the larger tubular member (65a). And, the small tubular member (65b) is press-fit into an annular groove portion formed in the end cap (41) and is fixed there, whereas the large tubular member (65a) is interfit to the small tubular member (65b) with play therebetween and is pressed against the port side end face of the cylinder barrel (56) by the coil spring (69).

In the way as described above, the large tubular member (65a) which is brought into sliding contact with the cylinder barrel (56) is of a floating type, which makes it possible to maintain the state of sliding contact between the port side end face of the cylinder barrel (56) and the valve plate (65) at excellent levels by absorbing errors of the dimensions of the cylinder barrel (56) and the large tubular member (65). An O-ring or the like (not shown) is interposed between the large tubular member (65a) and the small tubular member (65b), so that the rate of operating oil leak between the tubular members can be held below a predetermined amount.

Further, the leading end of the input shaft (25) passes through the end cap (41) and its end is provided with a charge pump (70) for providing supplement for leakage oil in the hydraulic closed circuit (32) of the HST (24). This charge pump (70) may be implemented by for example a trochoid pump and, as shown in FIG. 4, it is arranged such that common oil (operating oil) is drawn from an oil reservoir (common oil reservoir) (71) of the engine and is supplied, through check valves (72) and (72), to the lower in pressure of the pair of the oil passageways (66) and (66) together constituting the hydraulic closed circuit (32). At this time, the pressure of the operating oil supplied to the oil passageway (66) of lower pressure is a so-called charge pressure in the hydraulic closed circuit (32) and its value is set by a bleed-off valve (73).

Further, disposed in the hydraulic closed circuit (32) are a pair of relief valves (74) and (74) for causing the operating oil to circulate from the high-pressure side oil passageway (66) to the low-pressure side oil passageway (66), when the pressure state of the higher in pressure of the pair of the oil passageways (66) and (66) becomes excessively high. Besides, a bypass valve (75), which is a solenoid valve, is disposed so that the paired oil passageways (66) and (66) are communicated with each other under certain conditions for disconnecting the transmission of power in the HST (24). This bypass valve (75) can be switched selectively to a closed position (as shown in the figure) in which the oil passageways (66) and (66) are not communicated with each other or to a communication position in which the oil passageways (66) and (66) are communicated with each other upon receipt of a control signal from a controller (not shown). The bypass valve (75) has a clutch function of switching the state of the HST (24) and the state of the HMT (T) to the power disengaging state in which no power is transmitted.

The piston pump (30) on the input side of the HST (24) is constructed in the way as described above. And, also the motor (31) on the output side is constructed substantially in the same way as the piston pump (30), with the exception that the angle of inclination of the swash plate (76) is fixed. Accordingly, for the motor (31), components corresponding to those described with reference to the piston pump (30) are given the same reference numerals, and they are not described in detail here. Both the piston pump (30) and the motor (31) are, as described above, housed in the HST housing portion (40*b*) in the transmission casing (40). The interior of the HST housing portion (40*b*) is not filled with operating oil. Instead, as indicated by a virtual line of FIG. 3, an orifice passageway (80) is so formed as to open to the interior of the HST housing portion (40*b*) in the internal wall of the end cap (41). The orifice passageway (80) is supplied with operating oil by the charge pump (70) for emission of lubricant in the form of a mist. Because of this, the rotational resistance of the piston pump (30) and the cylinder barrel (56) of the motor (31) can be reduced greatly. Besides, it is possible to provide adequate lubrication and cooling by a supply of operating oil in the form of a mist to each sliding portion.

On the other hand, although not shown in FIG. 4, the charge pump (70) has also the function of acting as a lubrication pump for supplying the common oil to the engine (13). More specifically, the charge pump (70) is configured in such a way that the common oil is supplied first to the engine (13) and then to the HST (24) from the oil reservoir (71). Further, a drain passageway (40*e*) for the draining of operating oil is formed in the bottom of the HST housing portion (40*b*). The drain passageway (40*e*) is connected to the engine oil reservoir (71) for returning the common oil to the oil reservoir (71). To sum up, the common oil is circulated between the engine (13) and the HST (24) by the charge pump (70).

In the way as described above, the power unit (U) of the first embodiment is configured in such a way that the transmission casing (40) is attached to the crank case (42) and the engine (13) and the HMT (T) are formed into an integral body. In such a configuration, the common oil is circulated between the engine (13) and the HST (24), whereby the common oil is shared as an engine oil and as an operating oil for the HST (24).

And, of the oil conduit extending between the oil reservoir (71) and the HST (24), an oil feed route (R) from the engine (13) to the HST (24) is formed at an area along the outer surface of the crank case (42) as well as along the outer surface of the transmission casing (40). Further, a heat release fin (40*d*) is disposed on the outer surface of the transmission casing (40), and the oil feed route (R) is arranged so as to lie along the heat release fin (40*d*). The heat release fin (40*d*) constitutes a heat release part serving as a cooling means for cooling the common oil in the oil feed route (R) from the engine (13) to the HST (24).

Further, in the aforesaid configuration, it is arranged such that the common oil is supplied from the oil reservoir (71) to the engine (13) as well as to the HST (24), only through the use of the charge pump (70) of the HST (24). In some cases, however, it may be arranged such that a lubricating pump for the engine (13) is provided separately for lubrication of the engine (13) while the charge pump (70) provides a supply of oil from the engine (13) to the HST (24).

Next, the operation of the HMT (T) in accordance with the invention will be described. In the first place, the input shaft (25) is rotated by the running of the engine (13) of the ATV (A). A part of the rotational force is transmitted from the input gear (27) to the ring gear (36) of the planetary gear mechanism (28) and, at the same time, the cylinder barrel (56) of the piston pump (30) is rotated in the HST (24). By virtue of the rotation of the cylinder barrel (56), the piston (59) reciprocates along the variable swash plate (60) in the tilted state. Because of this, there is a supply of operating oil between the piston pump (30) and the motor (31). Therefore, a part of the rotational force transmitted to the input shaft (25) is transmitted to the motor (31).

Upon receipt of the operating oil, the cylinder barrel (56) of the motor (31) is rotated, and the motor shaft (33) integral with the cylinder barrel (56) is rotated. The resulting rotational force is transmitted to the sun gear (34) of the planetary gear mechanism (28) mounted on the motor shaft (33). As a result, the rotational force which is transmitted to the ring gear (36) of the planetary gear mechanism (28) in the MT (23) and the rotational force which is transmitted to the sun gear (34) by the HST (24) are synthesized through the plural planetary gears (35) and the synthesized force is output to the output shaft (26) from the planetary carrier (37). And, rotation of the output shaft (26) is transmitted, through components such as the secondary transmission (14), the drive shaft (18), the axle shafts (20) and (21), to the four wheels (front, rear, right, and left) (12) and (16) of the ATV (A).

During the aforesaid operation, the common oil lubricates the engine (13) and is delivered also to the HST (24) where it functions also as an HST operating oil. And, the common oil, the temperature of which has been increased on the side of the engine (13), will give off the heat in the oil feed route (R) to the HST (24) when flowing along the heat release fin (40*d*). As a result, the common oil is cooled. Therefore, after being increased in viscosity by cooldown to a lower temperature than the temperature on the side of the engine (13), the common oil thus cooled is supplied to the HST (24).

According to the first embodiment, since the common oil is supplied to the HST (24) after being increased in viscosity by cooldown to a lower temperature than the oil temperature on the side of the engine (13), this makes it possible to suppress leakage. Therefore, it becomes possible to prevent a drop in the mechanical efficiency of power transmission and the occurrence of seizing. Because of this, it is possible to put the power unit (U) in which the common oil is shared as an engine lubricating oil and an operating oil for the HST (24) by integral formation of the crank case (42) and the transmission casing (40), into practical use without performance decrement.

Further, the charge pump (70) of the HST (24) is utilized to circulate the common oil between the engine (13) and the HST (24) and, in addition, the heat release fin (40d) is provided in the transmission casing (40) for cooling the common oil. This makes it possible to achieve circulation and cooling of the common oil with a simplified structure.

Hereinafter, a second embodiment of the invention will be described.

Figure 5:
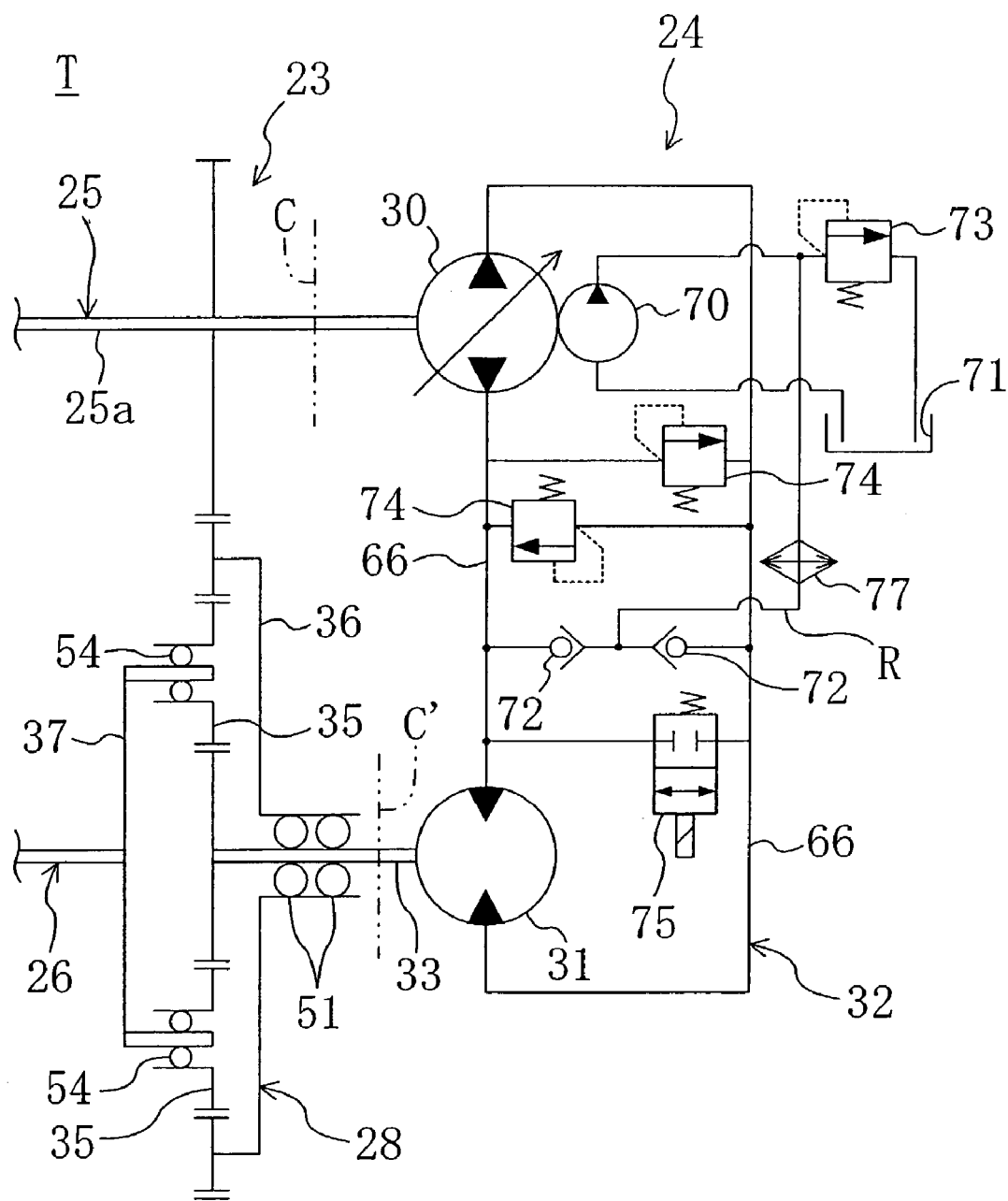
FIG. 5 is a schematic configurational diagram of a power unit in accordance with a second embodiment of the invention.

As shown in FIG. 5, the second embodiment of the invention is an example in which an oil cooler (77) is provided as a means for cooling the common oil. The oil cooler (77) is disposed in the oil feed route (R) from the engine's (13) side to the HST (24). The power unit (U) of the second embodiment, whose concrete structure is not shown in the figure, is almost the same as the power unit (U) of the first embodiment, with the exception that the heat release fin (40d) is not provided in the transmission casing (40). Further, as in the first embodiment, a supply of common oil from the oil reservoir (71) to the engine (13) and to the HST (24) is made by making utilization of the charge pump (70) of the HST (24).

With such a configuration, the common oil, when flowing from the engine's (13) side toward the HST (24) in the oil feed route (R), is cooled by the oil cooler (77) provided in the oil feed route (R). And, after being increased in viscosity by cooldown to a lower temperature than the temperature in the engine (13), the common oil thus cooled is supplied to the HST (24).

Like the first embodiment, since the common oil is supplied to the HST (24) after being increased in viscosity by cooldown to a lower temperature than the oil temperature on the side of the engine (13), this makes it possible to suppress leakage. Therefore, it becomes possible to prevent a drop in the mechanical efficiency of power transmission and the occurrence of seizing. Because of this, it is possible to put the power unit (U) in which the common oil is shared as a lubricating oil (such as engine oil and gear oil) and an operating oil for the HST (24) by integral formation of the crank case (42) and the transmission casing (40), into practical use without performance decrement, as in the first embodiment.

Further, the charge pump (70) of the HST (24) is utilized to circulate the common oil between the engine (13) and the HST (24) and, in addition, the oil cooler (77) for cooling the common oil is provided in the oil feed route (R). This makes it possible to achieve circulation and cooling of the common oil with a simplified structure.

Hereinafter, a third embodiment of the invention will be described.

Figure 6:
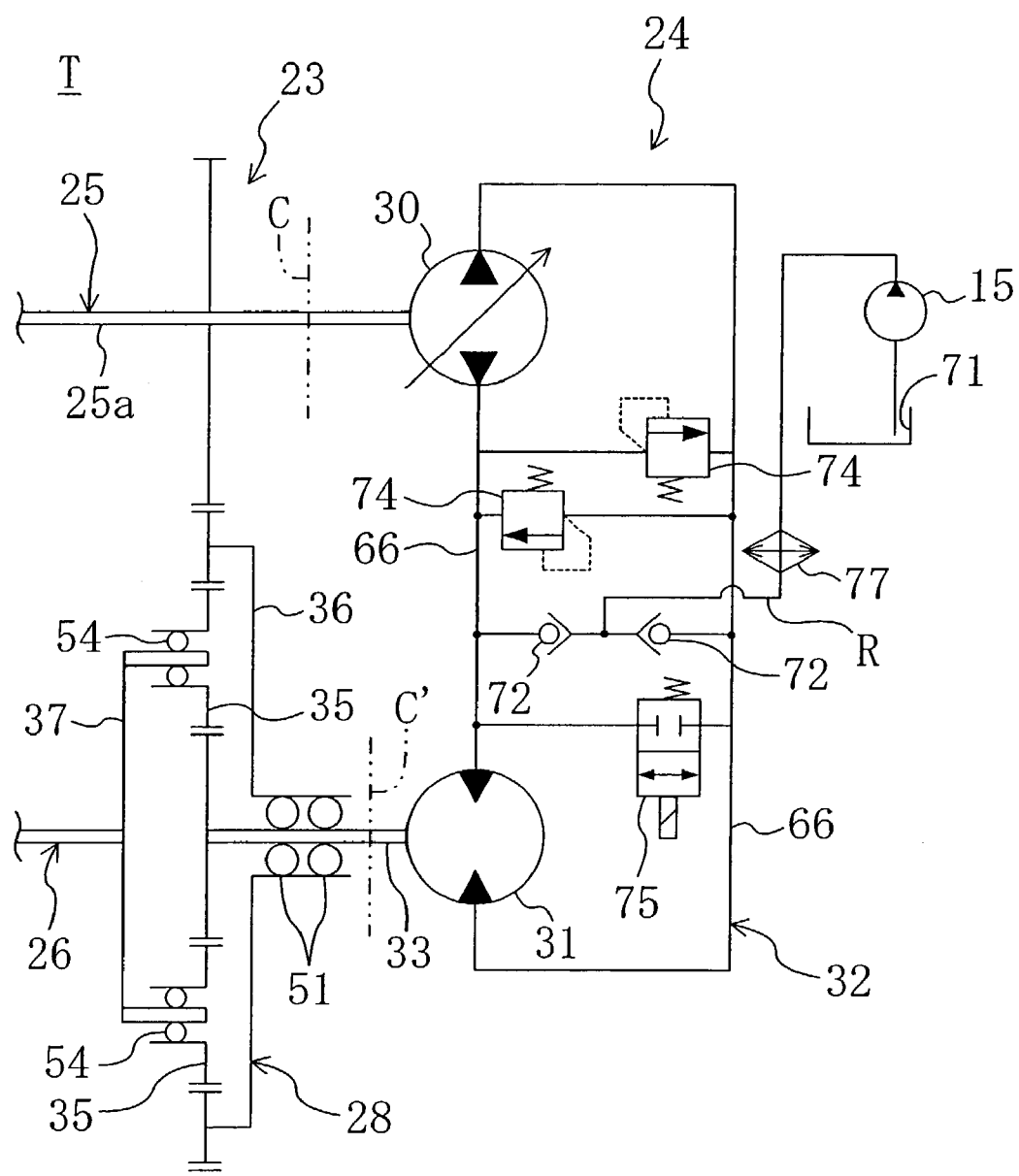
FIG. 6 is a schematic configurational diagram of a power unit in accordance with a third embodiment of the invention.

The second embodiment utilizes the charge pump (70) of the HST (24) as an oil feed means for supplying the common oil from the side of the engine (13) to the HST (24). On the other hand, the third embodiment of the invention is an example that utilizes a lubricating pump (15) of the engine (13) as an oil feed means, as shown in FIG. 6. The Figure shows the lubricating pump (15) of the engine (13) but does not show a lubricating route to the engine (13).

As in the second embodiment, the oil cooler (77) is used as a common oil cooling means. However, like the first embodiment, it may be arranged such that a heat release part is provided for example in the transmission casing (40) and the common oil is made to flow along that heat release part so that the common oil is cooled.

With such a configuration, the common oil, when flowing from the engine (13) toward the HST (24) in the oil feed route (R), is cooled by the oil cooler (77) provided in the oil feed route (R). And, after being increased in viscosity by cooldown to a lower temperature, the common oil thus cooled is supplied to the HST (24).

As in the second embodiment, since the common oil is supplied to the HST (24) after being increased in viscosity by cooldown to a lower temperature than the oil temperature on the side of the engine (13), this makes it possible to suppress leakage. Therefore, it becomes possible to prevent a drop in the mechanical efficiency of power transmission and the occurrence of seizing. Because of this, it is possible to put the power unit (U) in which the common oil is shared as an engine lubricating oil and as an operating oil for the HST (24) by integral formation of the crank case (42) of the engine (13) and the transmission casing (40) of the HMT (24), into practical use without performance decrement.

Further, the lubricating pump (15) of the engine (13) is utilized to circulate the common oil between the engine (13) and the HST (24) and, in addition, the oil cooler (77) is provided in the oil feed route (R) for cooling of the common oil. This makes it possible to achieve circulation and cooling of the common oil with a simplified structure.

Next, a fourth embodiment of the invention will be described.

Figure 7:
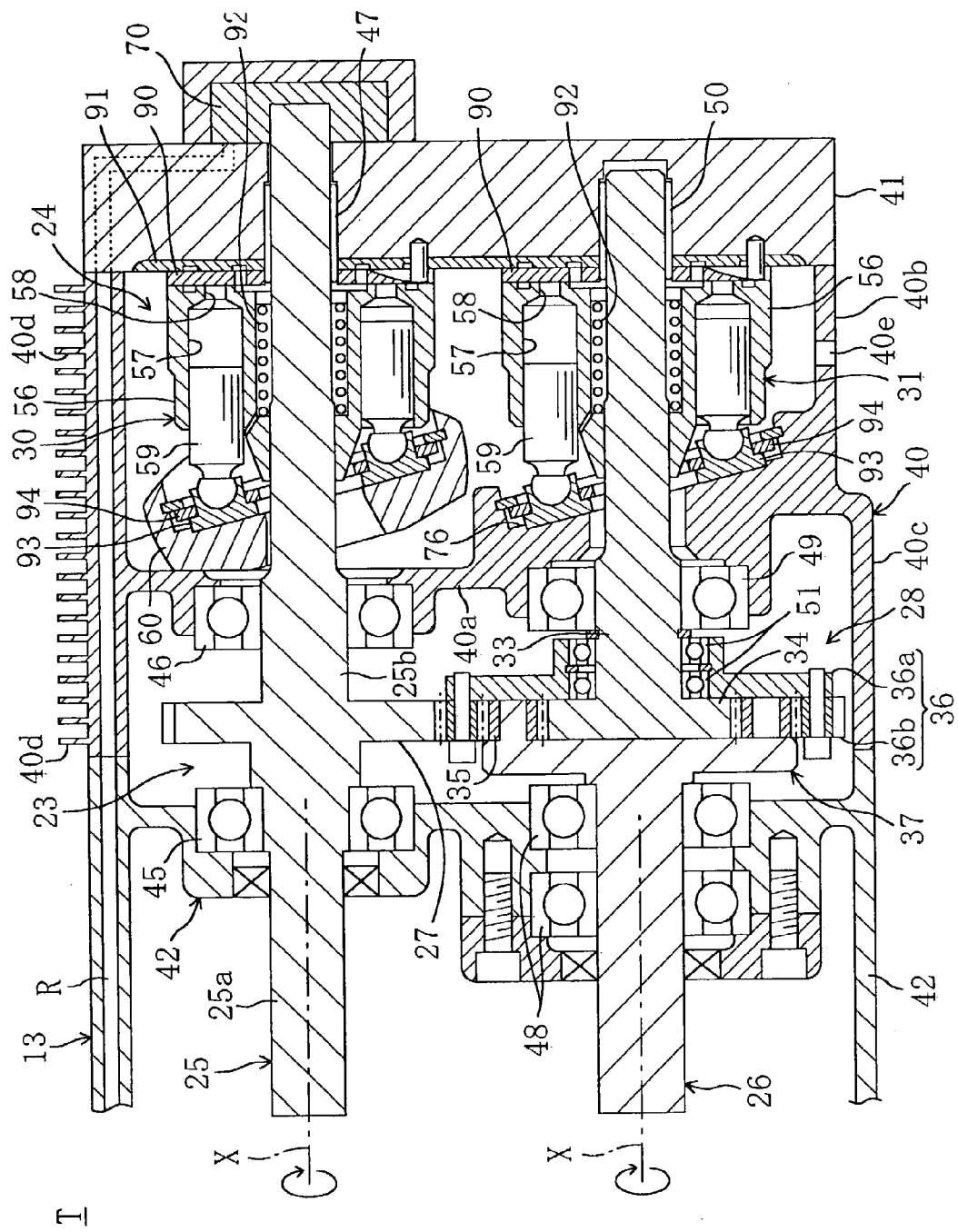
FIG. 7 is a cross-sectional structural view of a power unit in accordance with a fourth embodiment of the invention.

Referring to FIG. 7, there is shown a power unit (U) in accordance with the fourth embodiment of the invention. In the fourth embodiment, the cylinder barrel (56) of the piston pump (30) is separated from the pump shaft portion (25b) of the input shaft and they are coupled together by clearance fitting. The cylinder barrel (56) of the motor (31) of the HMT (T) is separated from the motor shaft (33) and they are coupled together by clearance fitting. Accordingly, the input gear (27) of the MT (23) is formed integrally with the input shaft (25), whereas the sun gear (34) of the planetary gear mechanism (28) is formed integrally with the motor shaft (33).

Further, in the piston pump (30) and the motor (31), a valve plate (90) having a general configuration is employed in place of the floating type valve plate (65) used in each of the previous embodiments, and it is arranged such that the valve plate (90) is pressed against a sliding contact plate member (91) which is disposed at the rear face of the end cap (41) and energized by the coil spring (92).

Furthermore, in the piston pump (30) and motor (31) of the fourth embodiment, the configuration that the thrust plate (61) is supported on the swash plate (60, 76) through the roller bearings (62) and (63) is disused. Instead, a slipper (93) and a slipper presser (94) are employed.

In the fourth embodiment, both the configuration for sharing the common oil as a lubricating oil (e.g., an engine oil for use in the engine (13) and a gear oil) and as an operating oil for the HMT (T) and the configuration for cooling the common oil are the same as shown in each of the previous embodiments. In other words, the arrangement that the charge pump (70) of the HST (24) or the lubricating pump (15) of the engine (13) is used for circulation of the common oil and the arrangement that the heat release fin (40*d*) or the oil cooler (77) is used for cooling of the common oil are the same as shown in each of the previous embodiments.

Further, the configurations of the other components are substantially the same as shown in each of the previous embodiments, except for the points described particularly. Accordingly, in the fourth embodiment, components corresponding to those described with reference to the first embodiment are given the same reference numeral and they are not described here accordingly.

And, in the fourth embodiment, the same working and effects as obtained in the first embodiment can be obtained and, in addition, it is possible to cut production costs by partial simplification of the structure of the HMT (T).

With respect to the previous embodiments, the invention may have the following configurations.

For example, in the previous embodiments, the power unit (U) that comprises the engine (13) and the HMT (T) which are formed into an integral body has been described. Alternatively, it may be arranged such that the power unit (U) comprises the engine (13) and the HST (24) which are formed into an integral body.

INDUSTRIAL APPLICABILITY

As described above, the invention provides a power unit capable of preventing the drop in efficiency and the occurrence of seizing in such cases that the engine shares a common oil with the HST. Besides, it is possible to provide a downsized configuration. The invention therefore provides a power unit suitable for ATVs, e.g., four wheeled buggy vehicles.

What is claimed is:

1. A power unit which comprises an engine and a transmission mechanism including a hydro static transmission which are integrally formed and in which a common oil is shared as a lubricating oil and as an operating oil,
    said power unit further comprising:
    an oil feed route serially connecting said engine and said hydro static transmission,
    oil feed means disposed in said oil feed route, and
    cooling means disposed in said oil feed route between said engine and said hydrostatic transmission,
    wherein said cooling means reduces a temperature of said common oil as said common oil flows serially from said engine to said transmission, and
    wherein said oil feed means provides a uni-directional circulation of said common oil from said engine to said cooling mean and then to said hydro static transmission.

2. The power unit of claim 1, wherein said transmission mechanism (T) comprises a hydro mechanical transmission which is a combination of said hydro static transmission (24) and a mechanical transmission (23).

3. The power unit of either claim 1 or claim 2, wherein:
    said cooling means comprises a heat release part (40*d*) provided on an outer surface of a casing (40,42), and
    said oil feed route (R) is so arranged as to lie along said heat release part (40*d*).

4. The power unit of either claim 1 or claim 2, wherein said cooling means comprises an oil cooler (77) provided in said oil feed route (R).

5. The power unit of either claim 1 or claim 2, wherein said oil feed means comprises a charge pump (70) of said hydro static transmission (24).

6. The power unit of either claim 1 or claim 2, wherein said oil feed means comprises a lubricating pump (15) of said engine (13).

7. A power unit which comprises an engine and a transmission mechanism including a hydro static transmission which is integrally formed and in which a common oil is shared as a lubricating oil and as an operating oil,
    said power unit further comprising:
    an oil feed route from said engine to said hydro static transmission,
    an oil reservoir connected to said oil feed route for storing said common oil,
    oil feed means for successively and serially circulating said common oil among said oil reservoir, said engine and said hydro static transmission, and
    cooling means disposed in said oil feed route between said engine and said hydro static transmission,
    wherein said cooling means reduces a temperature of said common oil as said common oil flows successively and serially from said engine to said cooling means and then to said hydro static transmission, and
    wherein said oil feed means provides a uni-directional circulation of said common oil.

8. The power unit of claim 7, wherein said transmission mechanism comprises a hydro mechanical transmission which is a combination of said hydro static transmission and a mechanical transmission.

9. The power unit of claim 7, wherein:
    said cooling means comprises a heat release part provided on an outer surface of a casing, and
    said oil feed route is so arranged as to lie along said heat release part.

10. The power unit of claim 7, wherein said cooling means comprises an oil cooler provided in said oil feed route.

11. The power unit of claim 7, wherein said oil feed means comprises a charge pump of said hydro static transmission.

12. The power unit of claim 7, wherein said oil feed means comprises a lubricating pump of said engine.

* * * * *